Figure 2A:
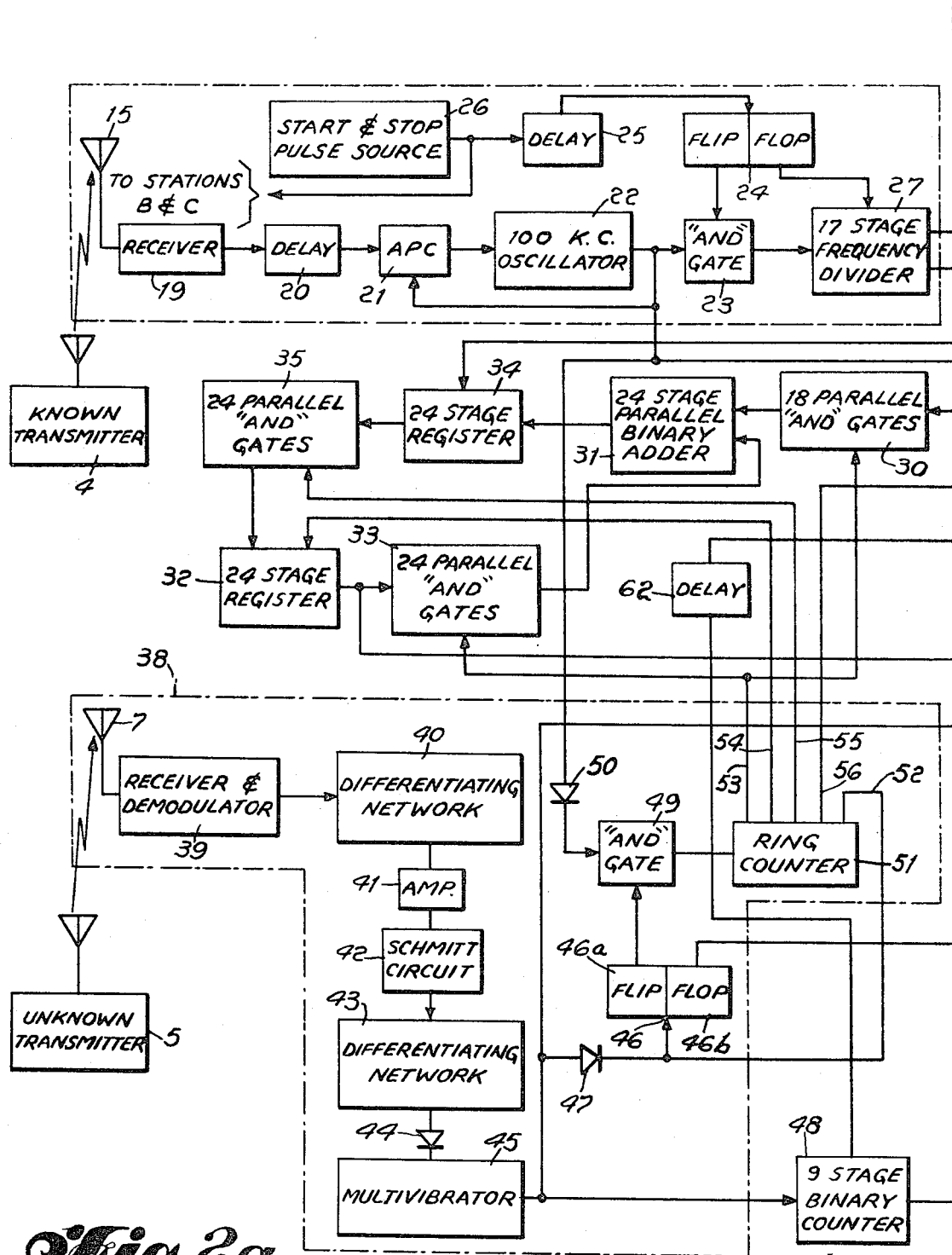

United States Patent [19]
Rogoff

[11] 3,757,340
[45] Sept. 4, 1973

[54] RADIO LOCATION SYSTEM
[75] Inventor: Mortimer Rogoff, Nutley, N.J.
[73] Assignee: International Telephone and Telegraph Corporation, Nutley, N.J.
[22] Filed: June 27, 1958
[21] Appl. No.: 745,222

[52] U.S. Cl. .............................. 343/112 R, 343/103
[51] Int. Cl. ............................................. G01s 5/02
[58] Field of Search ..................... 343/112, 15, 103

[56] References Cited
UNITED STATES PATENTS
2,534,841  12/1950  Wallace ................................. 343/12
2,864,081  12/1958  Steelman ............................. 343/112

Primary Examiner—Benjamin A. Borchelt
Assistant Examiner—Richard E. Berger
Attorney—Percy P. Lantzy

EXEMPLARY CLAIM

1. A radio location system for locating the position of a radio transmitter comprising a plurality of spaced receiving stations and a comparing station, each receiving station having means for summing the arrival times of signals received from said radio transmitter, means for counting said received signals means for dividing said summation by said count to yield average arrival times and means for transmitting said average arrival times and said signal count to said comparing station.

11 Claims, 5 Drawing Figures

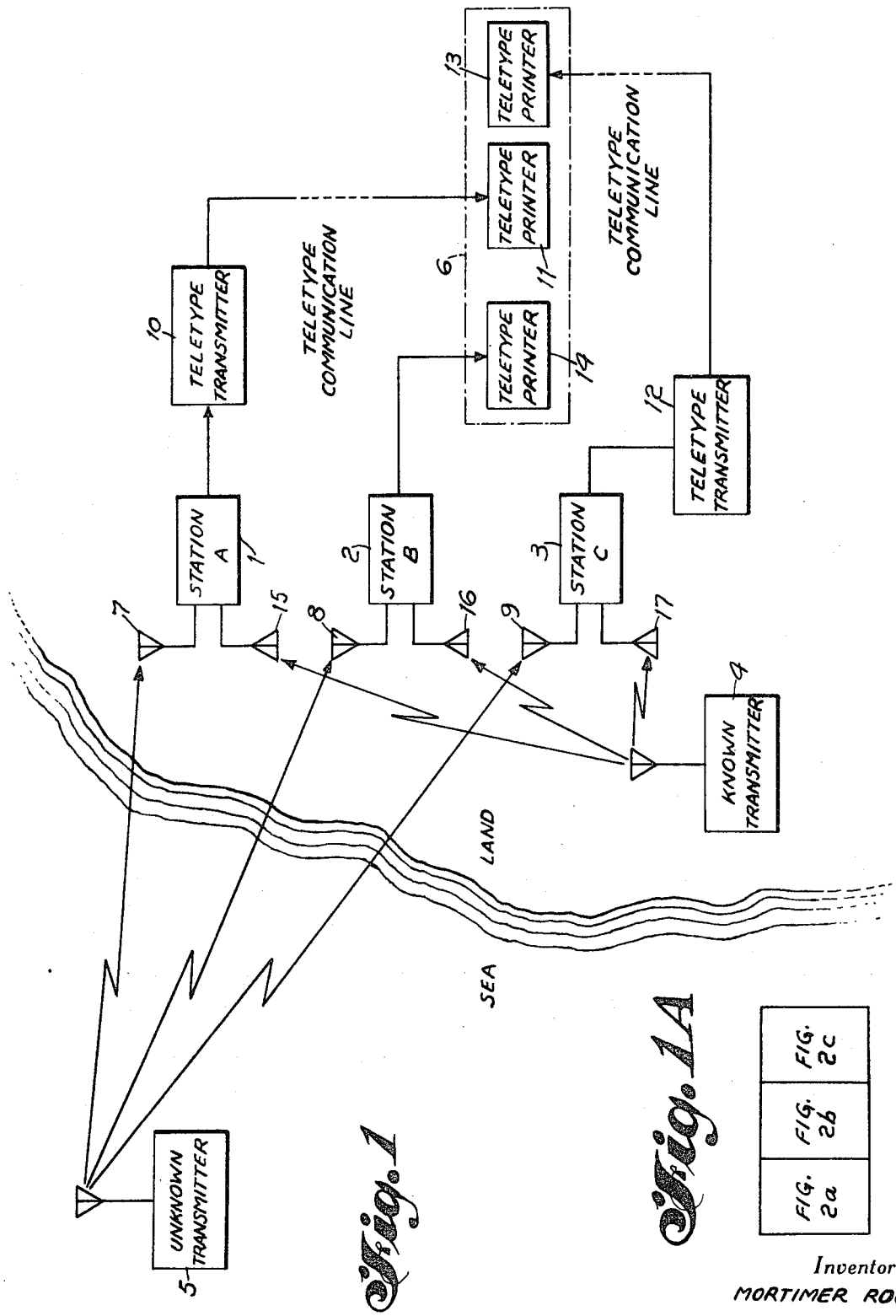

RADIO LOCATION SYSTEM

This invention relates to radio location systems and more particularly to a system for locating the position of a radio transmitter by detecting its signals at a plurality of different points and comparing the time of arrival of said signals at each point to establish the position of said radio transmitter.

Loran is a well-known radio location system employing spaced transmitter stations transmitting synchronized signals which may be detected by appropriate receiving equipment on a craft whereby the times of arrival of said signals may be compared to establish the position of said craft relative to said transmitter stations. Other prior systems employ what is known as "inverse Loran" whereby the position of a craft having a radio transmitter may be established by comparing the arrival times of signals from said transmitter at spaced radio receiving stations. In an inverse Loran system for locating the position or a cooperating or non-cooperating radio transmitter transmitting pulsed or otherwise modulated signals, the arrival times of said signals at spaced receiving stations on the ground are compared. In many instances this comparison is performed at one of the receiving stations. Thus the arrival times of signals at the other receiving stations must be communicated in some manner to the receiving station where the comparison is to be made. If the arrival time of each signal received at a receiving station or if the signal itself is communicated to the comparing station, it is necessary in many instances that a relatively broad-band communication link be employed between each receiving station and the comparing station.

Therefore, it is the principal object of this invention to provide an improved system for locating a cooperating or non-cooperating radio transmitter.

It is another object to employ a relatively narrow band communcation link between said stations.

It is another bobject to provide a system for determining the average arrival time of signals received at each receiving station and for comparing said average arrival times to establish the position of a radio transmitter.

It is another object to provide digital means for determining and representing said arrival times and said average arrival times.

It is a feature of this invention to provide digital means at each receiving station for computing the average arrival time or "time centroid" of signals received during a given interval and to communicate said time centroid in the form of a digital number from each receiving station to a comparing station by means of a narrow bandwidth communication link.

It is another feature to provide teletype transmitters at said receiving stations to communicate said time centroid numbers to said comparing station and to provide a plurality of teletype printers at said comparing station, each responsive to a different one of said teletype transmitters.

It is another feature to provide synchronized clock means at each receiving station from which to derive, during synchronized intervals, the time o arrival of signals received at each receiving station from a radio transmitter.

It is a further feature to provide at each receiving station means to sum said time of arrival numbers and to count the number of signals received and means to divide said summation by said count yielding the time centroid of signals received during said synchronized interval.

Figure 2B:
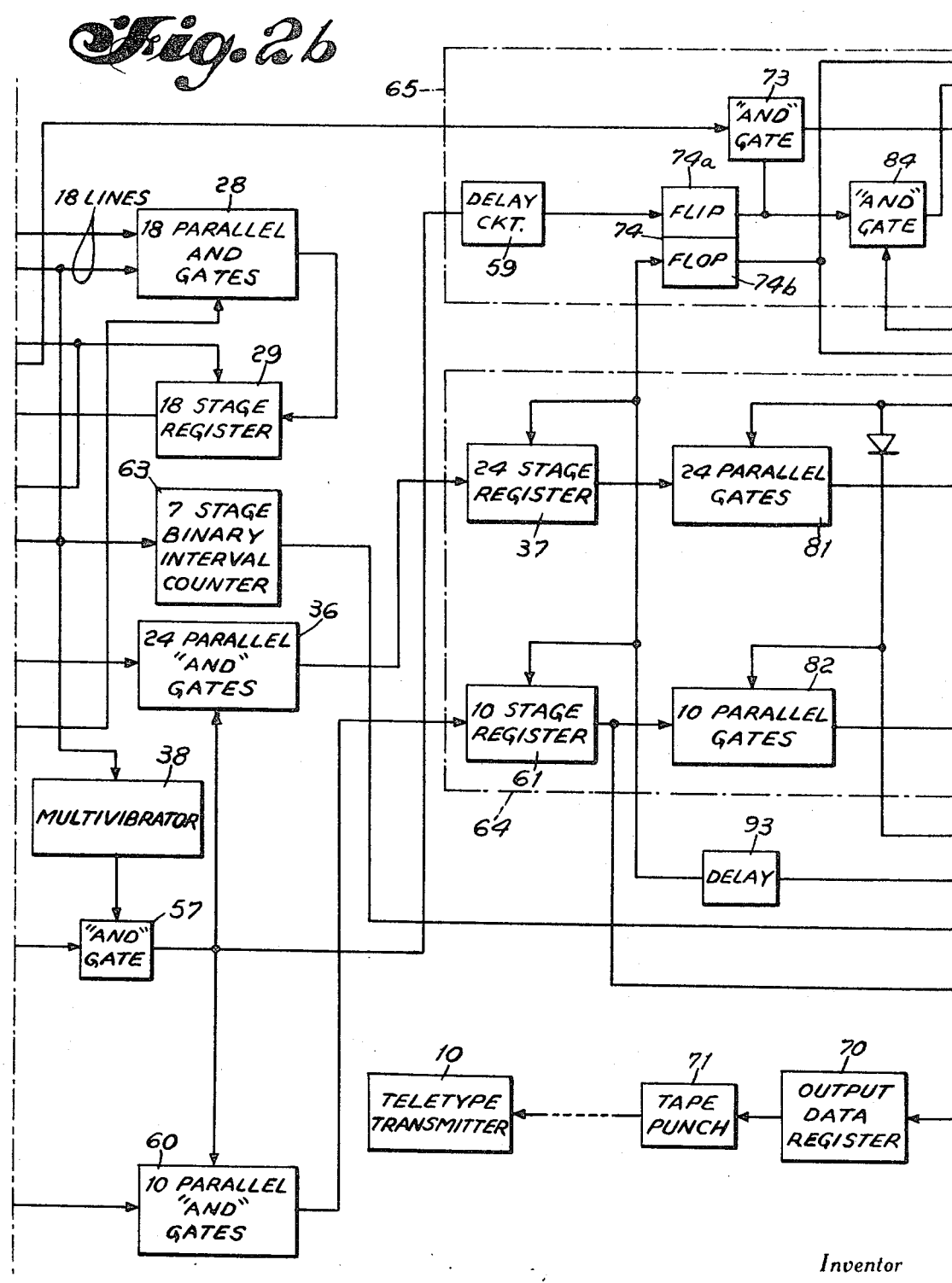
Figure 2C:
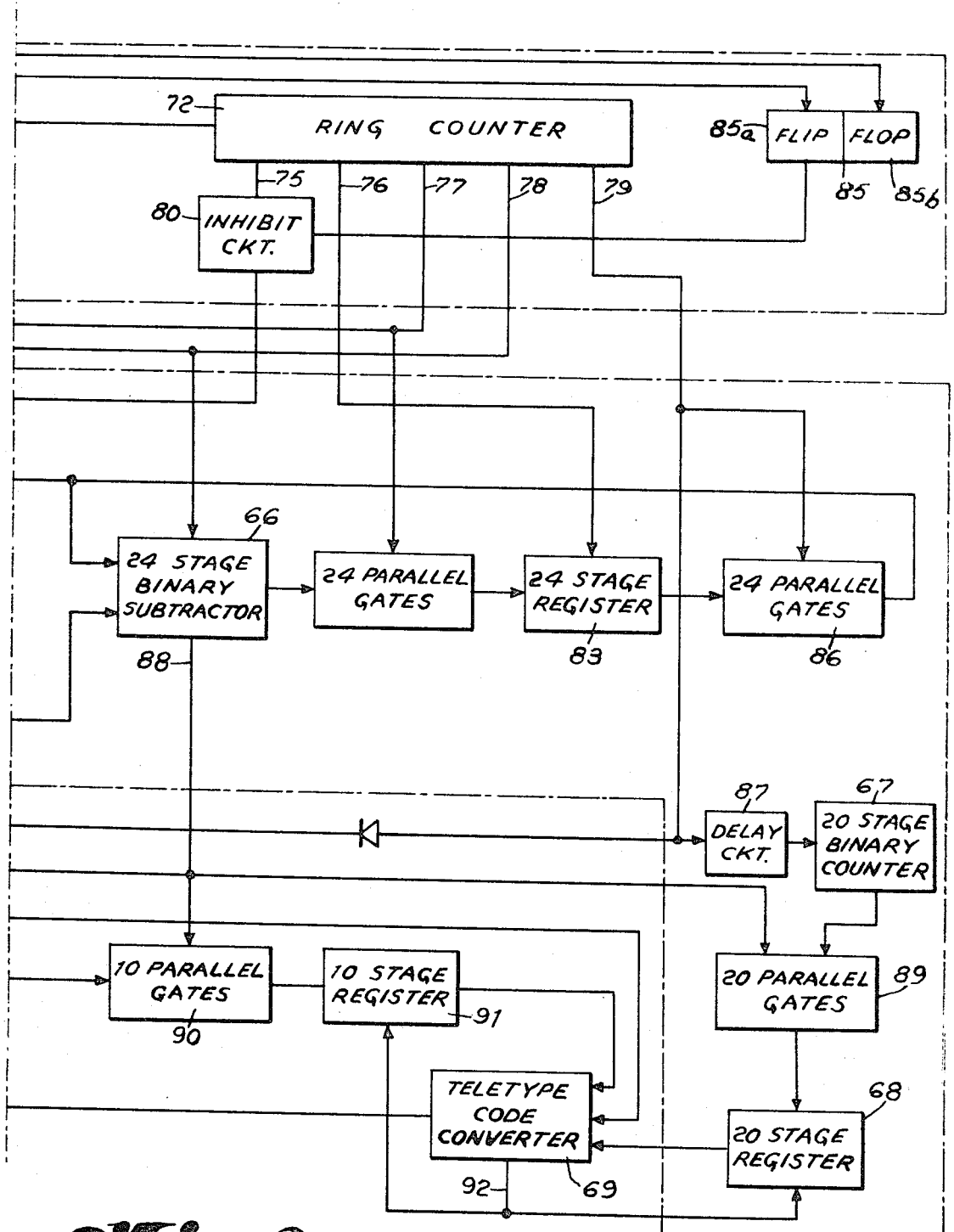

Other and further features and objects of this invention will be more apparent from the following specific description taken in conjunction with the figures in which:

FIG. 1 depicts a plan diagram of a radio location system employing a narrow band communication link, such as teletype, between stations; and FIGS. 2a, 2b, and 2c combine to form FIG. 1A presenting a block diagram of a binary system for determining the time centroid of received signals at a typical one of said receiving stations.

Turning first to FIG. 1, there is shown three receiving stations, A, B and C, spaced on the land at known locations 1, 2, and 3, respectively, a known transmitter at location 4 from whence to synchronize clocks at each of stations A, B, and C and are unknown transmitter aboard a craft at location 5. There is also shown a comparing station 6 immediately adjacent to station B. In operation signals from the transmitter at location 5 are detected by antennas 7, 8, and 9 feeding stations A, B, and C, respectively. In each of these stations the time centroid of signals received from the transmitter at location 5 over synchronized intervals are computed and represented as binary numbers. These numbers are then transmitted from each station via teletype communication lines to teletype printers at the comparing station 6. Station A feeds teletype transmitter 10 which in turn feeds teletype printer 11 via a teletype communication line, station C feeds teletype transmitter 13 which in turn feeds teletype printer 14 via another teletype communication line and station B feeds signals directly to teletype printer 15 requiring no teletype transmitter or line because it is adjacent to the comparing station 6. The time centroids are simultaneously computed at each of stations A, B, and C during the same interval of time as established by synchronized clocks at each of these stations which are responsive to signals from the known transmitter at location 4. Antennas 15, 16, and 17 feeding stations A, B, and C, respectively, are responsive to the signals from the known transmitter at location 4.

Turning next to FIG. 1A, there is shown a block diagram of the system at station A. The systems at stations B and C are identical to this and, therefore, only the system at station A will be described. The synchronized clock at station A, denoted 18, is responsive to 100 kc signals from the known transmitter at location 4. These signals are detected by antenna 15 and fed to receiver 19 whose output in turn is fed via delay circuit 20 to APC network 21 (automatic phase control). The output of network 21 is fed to 100 kc oscillator 22 to control its frequency and the output of oscillator 22 is fed back to APC circuit 21 so that the signal output of said oscillator is maintained synchronized with the signal from the 100 kc known transmitter at location 4. The output of oscillator 22 is fed to AND gate 23 which is opened and maintained open by flip-flop circuit 24 in response to a start pulse fed to flip-flop circuit 24 via delay 25 from start pulse source 26. When gate 23 opens, the output of oscillator 22 is fed to 17-stage frequency divider 27. Pulse source 26 also feeds start pulses to stations B and C which are appropriately delayed to simultaneously actuate similar flip-flop circuits to control similar gates at those stations thereby causing pulses from similar oscillators to be fed to similar frequency dividers. Delay circuit 25 serves to make up the time difference of transmission of a start pulse from pulse source 26 to flip-flop circuit 24 at station A so that all three stations being counting by way of their associated frequency dividers at the same instant of time. The output of 17-stage frequency divider 27 consisting of 18 lines each carrying a binary bit of information is fed via gates 28 to register 29. The output of register 29 is fed via gates 20 to 24-stage parallel binary adder 31 which serves to add the output from register 29 with the output from 24-stage register 32. The output from register 32 is applied to binary adder 31 via gates 33, and this same output represented by 24 lines is fed to 21-stage register 34 whose output is in turn fed to register 32 via gates 35. The output of register 32 is also fed via gates 26 to 24-stage register 37 (shown in FIG. 2b).

The opening of gates 28, 33, 35, and 36 and the clearing of registers 29, 32, and 34 are initiated by signals from device 38 which is comprised of antenna 7 responsive to signals from the unknown transmitter at location 5, receiver and demodulator 39 coupled to said antenna and yielding pulses or signals which may be at a fixed repetition rate or may be random. These pulses or signals are fed to differentiating network 40 whose output is amplified via amplifier 41 and fed to a cathode coupled binary circuit, more commonly called a Schmitt circuit, 42 which yields squared pulses. A Schmitt circuit is shown in FIGS. 5–17 on page 165 of Millman and Taub, "Pulse and Digital Circuits" wherein is also described the operation of such a circuit. These squared pulses are fed to differentiating network 43 which yields positive and negative spikes, and the positive spikes are passed by diode 44 to multivibrator 45 whose output is preferably a short duration pulse. Thus the action of circuits 40 to 45 is to produce a short duration pulse each time the signal from receiver and demodulator 39 is above a certain level and its slope becomes zero. Pulses from multivibrator 45 are fed to flip-flop circuit 46 via diode 47, to gates 28 serving to open said gates and also to nine-stage binary counter 48 which counts said pulses. One stage of flip-flop circuit 46, say for example, 46a, feeds a control signal to AND gate 49 which is also fed positive signals from oscillator 22 via diode 50 so that when AND gate 49 is opened by a signal from stage 46a when that stage conducts, positive signals from oscillator 22 are fed to ring counter 51. Ring counter 51 is of the close loop type, its last stage serving to condition its first stage so that pulses fed to it via AND gate 49 cause it to continually count so long as it receives said pulses. The various stages of this ring counter which conduct sequentially serve to feed control signals to open various gates and other control signals to clear various registers in a sequential order, and the last stage of said ring counter feeds a signal via line 52 to flip-flop circuit 46 causing it to "flip" and stage 46b to conduct and stage 46a to cease conducting. Subsequent to AND gate 49 opening and gates 28 opening, ring counter 51 commences to count sequentially applying signals to lines 53, 54, 55, 56 and 52 in that order causing the following sequence of operations: gates 30 and 33 to open feeding numbers from registers 29 and 32, respectively, to adder 31; register 32 to clear; gates 35 to open feeding the number from register 34 to register 32; registers 29 and 34 to clear; and finally, stage 46a of flip-flop circuit 46 to cease conducting causing gate 49 to close and ring counter 51 to cease counting.

When ring counter 51 has ceased counting and a signal has been applied via line 52 to flip-flop circuit 46 causing stage 46b to conduct and before another pulse is applied from multivibrator 45 to flip-flop circuit 46, AND gate 57 will open and remain open so long as stage 46b conducts. If the last stage of 17-stage frequency divider 27 yields a pulse output to multivibrator 58 which in turn feeds a pulse to AND gate 57 while that gate is open, then the pulse from multivibrator 58 will be passed through AND gate 57 to delay circuit 59 (shown in FIG. 2b). The signal from AND gate 57 originating in the last stage of frequency divider 27 also serves to control gates 36 and 60 thereby applying the numbers stored in register 32 and in counter 48 to registers 37 and 61, respectively. The last stage of frequency divider 27 also feeds a signal via delay 62 to counter 48 clearing that counter and to binary interval counter 63 which counts said signals, Delay 62 is such that the signal originating in the last stage of frequency divider 27 serves to open gates 60 applying a number from counter 48 to register 61 before said counter is cleared.

Referring again to FIG. 1A, there is shown one system for performing the binary number division required to yield the time centroid number, comprising binary number divider 64 and scheduling means 65 which serves to control the subtraction process performed by divider 64 in its operation of computing the time centroid. Obviously, other systems known to the art could be employed to perform this division without detracting from the spirt and scope of this invention. The divider and dividend numbers are the numbers stored in registers 61 and 37, respectively, which represent the number of signals received from the unknown transmitter during an interval and the summation of arrival times of said signals, respectively. In operation, the divider is subtracted from the dividend in binary subtracter 66 until a negative number is registered in said subtracter and the number of said subtractions is counted by binary counter 67 to obtain the quotient which is fed to register 68 which in turn feeds teletype code converter 69 whose output is applied to data register 70 which in turn feeds tape punch 71. In the case of stations A and C, the tape punch feeds a teletype transmitter which transmits time centroid numbers and interval identification to an associated teletype printer at the comparing station 6 shown in FIG. 1. Since the comparing station is immediately adjacent the station B, the tape punch at station B feeds directly to a teletype printer at the comparing station.

The subtraction process and thus division is commenced by divider 64 when ring counter 72 commences to count in response to 100 kc signals fed to that counter from 100 kc oscillator 22 via AND gate 73, which opens when stage 74a of bistable flip-flop circuit 74 conducts. Stage 74a of flip-flop circuit 74 is caused to conduct by a signal from AND gate 57 via delay circuit 59 so that stage 74a conducts after numbers are applied from registers 23 via gates 36 and from counter 48 via gates 60 to registers 37 and 61, respectively. Upon the opening of gates 73, 100 kc signals fed to counter 72 cause the stages of that counter to sequentially conduct. Sequential signals are taken from counter 72 via lines 75, 76, 77, 78, and 79 which are energized sequentially in that order. Line 75 applies a signal via INHIBIT circuit 80 to gates 81 and 82, thus applying the divider and dividend numbers from registers 61 and 37, respectively, to binary subtracter 66 wherein the divider is subtracted from the dividend. As counter 72 continues to count in response to 100 kc signals, line 76 is energized feeding a signal to register 83 serving to clear that register; thus when, subsequently, line 77 is energized feeding a signal to gates 84 causing said gates to open, the subtrahend from subtracter 66 is applied to register 83. The signal from line 77 is also fed to AND gate 84 opening that gate and allowing the signal from stage 74a of flip-flop circuit 74 to be applied to stage 85a of bistable flip-flop circuit 85 causing stage 85a to conduct, and since the output of stage 85a is coupled to INHIBIT circuit 80 so that circuit 80 blocks the signal from line 75 when stage 85a conducts, the signal from line 75 will no longer control gates 81 and 82. Subsequently when line 78 is energized, a signal is fed to subtracter 66 to clear that subtracter. Again, subsequently when line 79 is energized, gates 24 and gates 82 are opened feeding the number in registers 83 and 61 representing the subtrahend and subtracter to binary subtracter 66. The signal from line 79 is also fed via delay circuit 87 to binary counter 67. Since the last stage of counter 72 serves to condition the first stage so that subsequent 100 kc signals cause the counter to continue to count in the same sequence, the subtraction process hereinabove described continues until the output of binary subtracter 66 is a negative number at which time a signal is applied via line 88 from subtracter 66 to gates 89 opening those gates and applying the output of binary counter 67 to register 68. Line 88 also applies the same signal to gates 90 opening those gates so that the parallel binary number in register 61, indicative of received signal count, is applied to register 91. Line 88 also applies the same signal to registers 37 and 61 via delay 93 serving to clear those registers and also causing stage 74b of flip-flop circuit 74 to conduit thereby applying a voltage to line 78 clearing subtracter 66 and to stage 85b of flip-flop circuit 85 causing that stage to conduct and, since stabe 85b then ceases to conduct, INHIBIT circuit 80 will not block the signal from line 78 from opening gates 81 and gates 82 at the commencement of the next division.

Registers 91 and 68 feed received signal count numbers and time centroid numbers, respectively, to teletype code converter 69 and an appropriate stage of binary interval counter 63 also feeds a signal to teletype code converter 69 serving to identify an appropriate time centroid number fed to converter 69 during the same interval. Subsequently, when the numbers from registers 91, 68 and the appropriate signal from counter 63 have been converted to serial form and applied to output data register 70, converter 69 provides a signal via line 92 to clear registers 91 and 68.

While I have shown and described the principles of my invention in connection with a specific embodiment, it is rcognized that various changes and modifications may be made therein without departing from the spirit or scope of the invention. Therefore, it is my purpose to cover in the appended claims all such changes and modifications that fall within the scope of the invention.

I claim:

1. A radio location system for locating the position of a radio transmitter comprising a plurality of spaced receiving stations and a comparing station, each receiving station having means for summing the arrival times of signals received from said radio transmitter, means for counting said received signals means for dividing said summation by said count to yield average arrival times and means for transmitting said average arrival times and said signal count to said comparing station.

2. A radio location system for locating the position of a radio transmitter transmitting pulse or otherwise modulated signals comprising a plurality of spaced receiving stations, means for providing synchronized clock signals to each of said receiving stations, and comprising for each station counting means responsive to said clock signals, adding means coupled to the output of said counting means, means responsive to signals from said radio transmitter for coupling the output of said counting means to said adding means so that the arrival times of signals from said radio transmitter as represented by said counting means are added, means to count said radio wave signals received and means to divide said summation of arrival times by said count to yield average arrival time.

3. A radio location system as claim 2 and further including at each station means to transmit said average arrival time and said count to a comparing station for determining the differential average time of arrival of signals from said radio transmitter at each of said receiving stations so as to establish the location of said radio wave transmitter.

4. A radio location system for locating the position of a radio transmitter comprising a plurality of spaced receiving stations, a transmitter to transmit synchronizing signals and a comparing station, each receiving station comprising means for providing synchronized clock pulses in time synchronism with said tramsmitted synchronizing signals, first counting means responsive to said clock pulses, adding means, means responsive to signals from said radio transmitter for coupling the output of said counting means to said adding means so that the arrival times of said radio signals indicated by the output of said counting means are added together, second counting means to count said radio signals received, means for dividing the output of said adding means by the output of said second counting means and means to communicate the output of said dividing means and the output of said second counting means to said comparing station tso that the average arrival times of said transmitted signals from said radio transmitter to each of said receiving stations may be compared and the hyberbolic coordinates describing the location of said radio transmitter determined.

5. A radio location system as in claim 4 wherein said means for providing synchronized clock pulses to each of said receiving stations includes receiver means, delay means coupled to the output of said receiver means, a controlled oscillator and phase control means coupling said controlled oscillator and said delay means so that the outputs of said controlled oscillators at each of said stations are time synchronized and means at each of said receiver stations to apply the output of said controlled oscillator to said first counting means.

6. A radio location system as in claim 4 wherein each said receiving station further includes a controlled oscillator and said first counting means and said adding means include frequency divider means coupled to the output of said controlled oscillator by first gating means, a source of starting pulse signals means to apply said starting signals to said gating means simultaneously with similar starting signals of said other receiving stations, first storage means to store the output of said frequency divider, second gating means coupling the output of said frequency divider to said first storage means and responsive to signals from said radio transmitter, adding means, third gating means coupling the output of said first storage means to the input of said adding means, second storage means coupled to the output of said adding means, third storage means, fourth gating means coupling the output of said second storage means to said third storage means, fifth gating means coupling the output of said third storage means to the input of said adding means and control means responsive to signals from said radio transmitter for applying signals to control said second, third, fourth and fifth gating means and to control clear all of said storage means in a predetermined sequence so that the arrival times of said signals from said radio transmitter at each of said stations are summed and their summation stored in said third storage means at each of said receiving stations.

7. A radio location system as in claim 4 wherein said means to communicate includes teletype communication link.

8. A radio location system as in claim 4 wherein said comparing location includes teletype printers responsive to the outputs from said receiving stations for printing average arrival times, and said counts of radio signals.

9. A radio location system for locating the position of an unknown radio transmitter comprising a transmitter at a known location a plurality of spaced receiving stations each comprising automatic phase control means and a controlled oscillator coupled to said automatic phase control means, first receiver means responsive to signals from said transmitter at said known location, delay means coupling the output of said receiver means to said automatic phase control means, first gating means coupling the output of said oscillator to first counting means, a starting pulse source means responsive to signals from said starting pulse source to control said first gating means and to clear said first counting means, first storage means coupled to the output of said first counting means by second gating means, binary adding means coupled to the output of said first storage means by third gating means, second storage means coupled to the output of said binary adding means, third storage means coupled to the output of said second storage means by fourth gating means, fifth gating means coupling the output of said third storage means to the input of said binary adding means, second receiver means responsive to signals from said unknown radio transmitter, differentiating means coupled to the output of said second receiver means, pulse generating means coupled to the output of said differentiating means, gate control means and storage clearing means coupled to the output of said pulse generating means and to the output of said oscillator so that a pulse from said pulse generating means causes successive pulses from said controlled oscillator to be applied to said first, third, fourth and fifth gating means, in that order, and other successive pulses from said oscillator to be applied to said first, second and third storage means clearing them in that order, second counting means coupled to the output of said pulse generating means, fourth storage means coupled to the output of said second counting means, dividing means coupled to said third storage means and said second counting means, teletype converting means, means coupling the output of said dividing means and said second counting means to said teletype converting means, output data storage means coupled to the output of said converting means, tape punch means coupled to the output of said output data storage means, a teletype transmitter coupled to the output of said tape punch means and teletype printing means responsive to said teletype transmitter for printing numbers representative of average arrival times of said radio signals and said radio signal count.

10. A radio location system as in previous claim 9 and further including third counting means coupled to the output of said first counting means, teletype means to apply the output from said third counting means to said code converting means so that said teletype printing means prints interval identification symbols associated with said average arrival times and counts.

11. A radio location system for locating the position of a radio transmitter comprising a plurality of spaced receiving stations and a comparing station, each receiving station having means for summing the arrival times of signals received from said radio transmitter, means to derive the average arrival times therefrom and means for transmitting said average arrival times to said comparing station.

* * * * *